Jan. 9, 1923.
C. I. BAKER.
STORAGE WATER HEATING SYSTEM.
FILED SEPT. 13, 1921.
1,441,201
3 SHEETS-SHEET 2
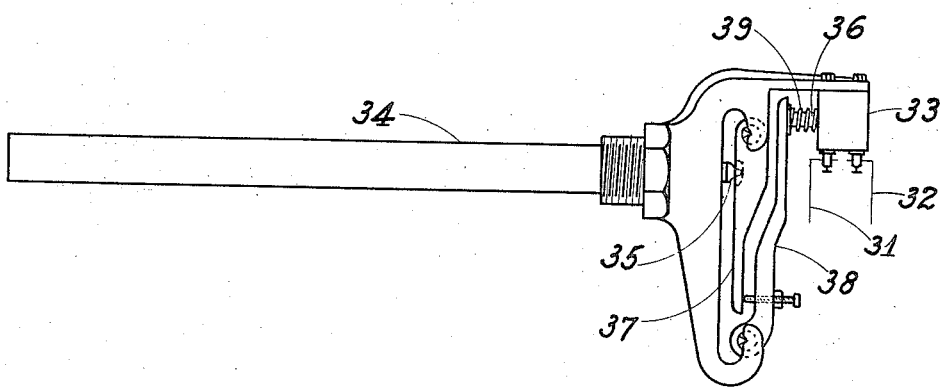
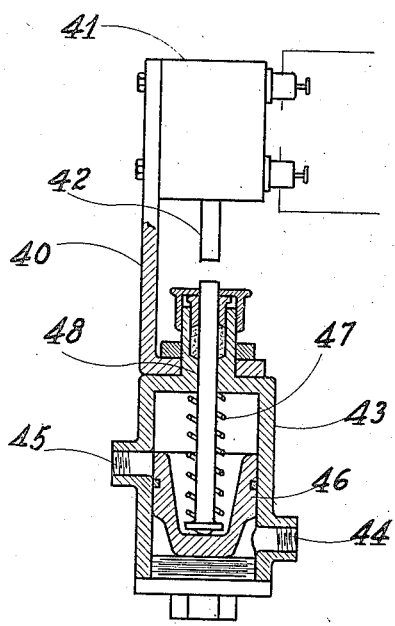
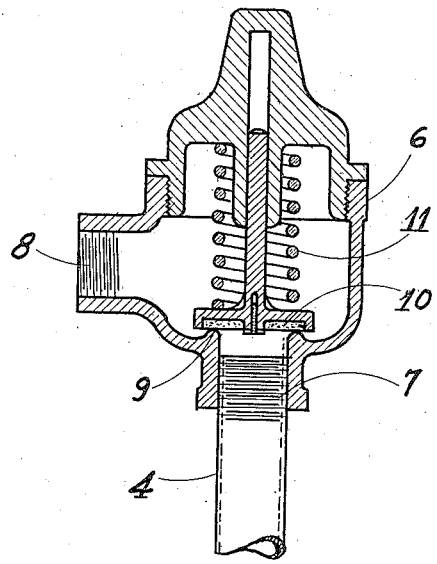
WITNESSES
A B Wallace
INVENTOR
Charles I. Baker
by Winter & Brown
ATTORNEYS

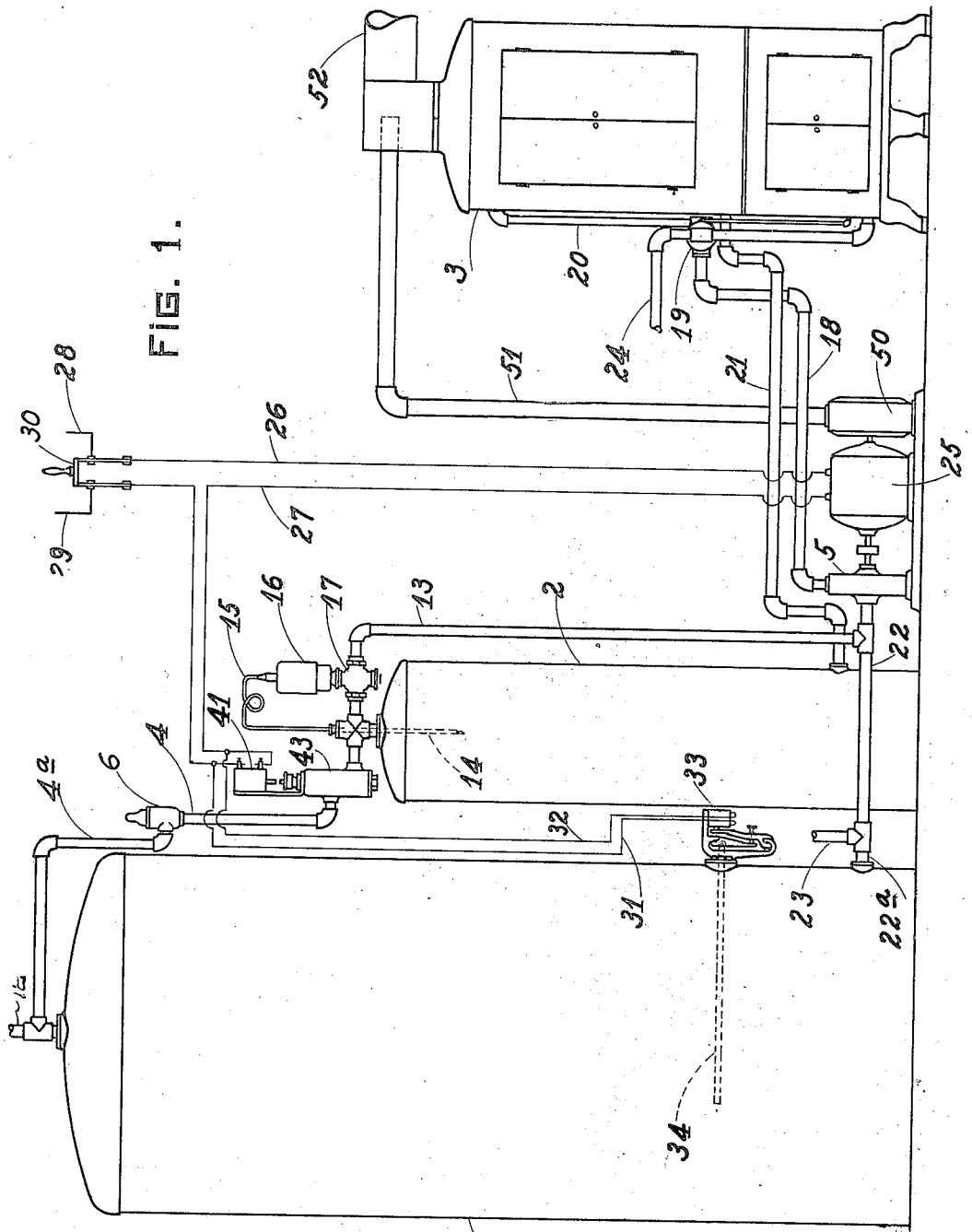

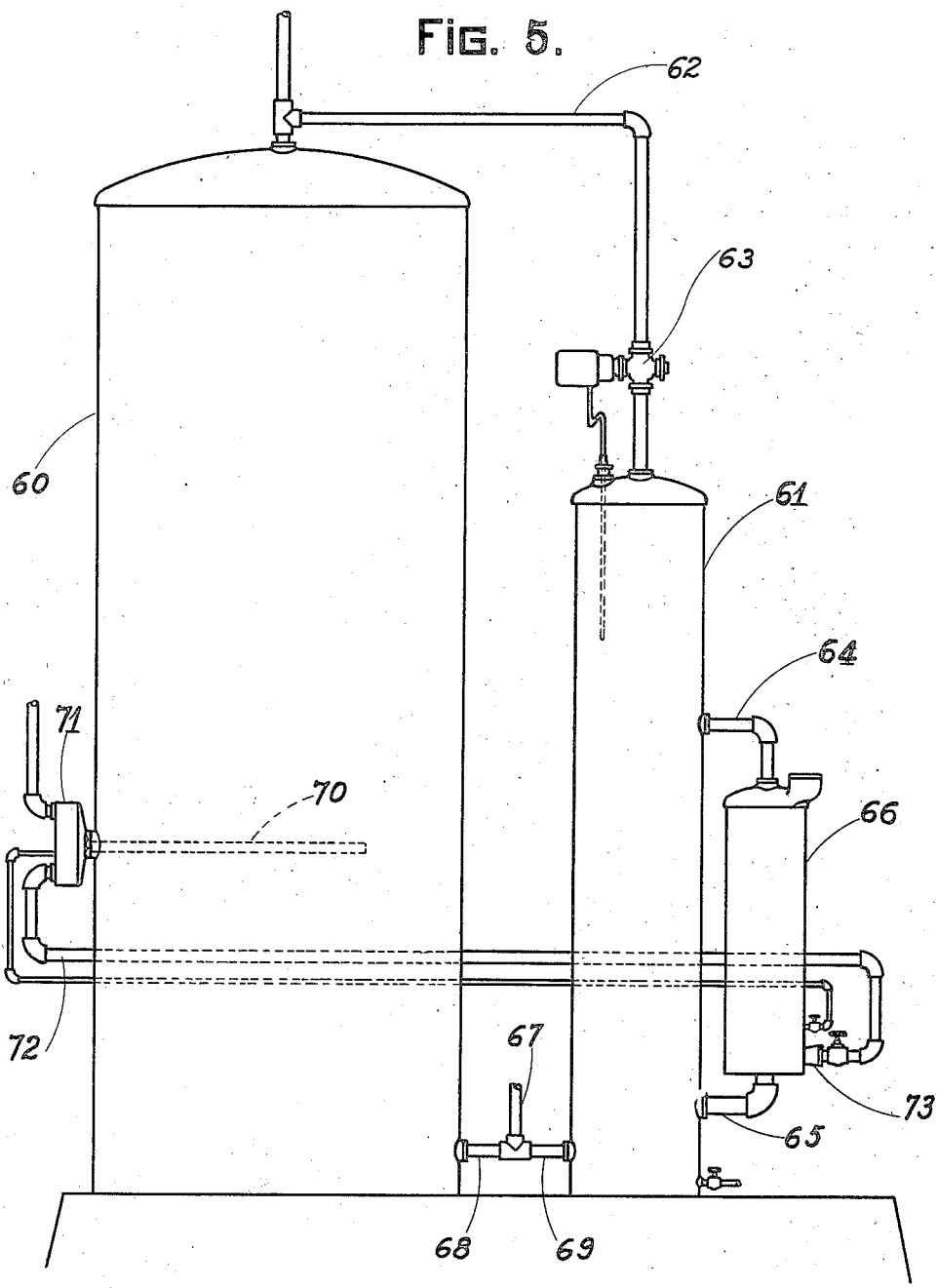

Patented Jan. 9, 1923.

1,441,201

UNITED STATES PATENT OFFICE.

CHARLES I. BAKER, OF GLENSHAW, PENNSYLVANIA.

STORAGE WATER-HEATING SYSTEM.

Application filed September 13, 1921. Serial No. 500,468.

*To all whom it may concern:*

Be it known that I, CHARLES I. BAKER, a citizen of the United States, and a resident of Glenshaw, in the county of Allegheny and State of Pennsylvania, have invented a new and useful Improvement in Storage Water-Heating Systems, of which the following is a specification.

The invention relates to automatic storage water heating systems, such as are installed in apartment houses, hotels, stores and other places where it is necessary or desirable to have a large volume of sufficiently heated water available for use during a short period of time.

As now constructed, storage water heating systems of the general character contemplated herein include a storage tank and a water heater, usually of the coil, gas-heated type, having its cool water inlet and its heated water outlet connected to the tank. In a position to be subjected to the temperature of the water in the tank, there is a thermostat for controlling the fuel supply to the heater, the arrangement being such that the fuel supply is automatically shut off when the tank contains its maximum supply of sufficiently heated water and is opened when the tank does not contain such supply.

To guard against the accummulation of sediment in the coils of the heater and the consequent dangers incident to the formation of steam, the systems are so designed that initially cool water must pass through the heater two or more times before it becomes sufficiently heated, that is to say, heated to the desired temperature, which, for most purposes, is about 150° F. In this respect, the arrangement is such that each time the water passes or circulates through the heater, its temperature is stepped up in increments which are usually about forty degrees. Also, for the same general purpose, the heated water outlet of the heater is connected to the middle portion of the tank so that when steam is formed in the heater it will be discharged into, and be quickly condensed by, the large body of water in the tank above such connection.

In the use of these systems it happens, not infrequently, that all the heated water is drawn from the tank during a period of heavy demand. When this occurs the tank is filled with cool water, and, due to the above explained essential feature of design of the systems, substantially the entire body of cool water in the tank must pass through the heater two or more times before any sufficiently heated water is available for use. This requires from one to three hours depending largely upon the size of the tank, and such long periods of interruption in the service are quite objectionable. Furthermore, in addition to the interrupted character of service rendered by the systems, their efficiency is low due to high radiation losses resulting from the necessary use of large tanks and due to low efficiency heaters.

The primary object of this invention is to improve automatic storage water heating systems to the end that there will not be long periods during which sufficiently heated water is not available. Further objects are to increase the efficiency of such systems, and to provide a system, the several units of which may be placed wherever convenient and in any relative positions with relation to each other.

The invention is illustrated in the accompanying sheets of drawings of which Fig. 1 is a somewhat diagrammatic representation of the preferred form of the invention; Fig. 2 a combined sectional view and elevation of a flow operated switch; Fig. 3 a sectional view of a relief valve; Fig. 4 a side view of a thermally controlled switch; and Fig. 5 a diagrammatic view similar to Fig. 1 illustrating a second embodiment of the invention.

In the practice of the invention, a heating tank is provided in addition to and of smaller capacity than the storage tank, and suitable connections and control elements are provided to the end that unit volumes of water are alternately heated to the required temperature in the heating tank and discharged therefrom into the storage tank. For heating the water there is preferably provided a water heater of the coil type connected to the heating tank in such a manner that water from such tank may circulate through the heater the required number of times to sufficiently heat it. The flow of water from the heating tank through the heater until sufficiently heated, and the flow of the sufficiently heated water from the heating to the storage tank may be effected by gravity, or such flow may be effected by a pump or like pressure applying device, the latter being preferable. Thermally controlled means are provided to the end that when the storage tank has been supplied with a predetermined volume of sufficiently heated water, the heating of further unit volumes of water in the heating tank is stopped. When gravity flow of water is used, this control of the heating of the water may be effected by controlling the supply of fluid fuel to the water heater, and when the flow of water is effected by a pump the control may be effected by thermally controlling the operation of the pump.

Having reference first to the embodiment of the invention illustrated in Fig. 1, a storage tank 1 is shown as standing in upright position and adjacent to it a unit heating tank 2 of smaller capacity than the storage tank. Because in this embodiment of the invention a pump is used for circulating water through the heater and discharging it from the heating into the storage tank, either or both of these tanks may be placed in any desired position with reference both to each other and to the heater, a matter of considerable importance in making installations in places of limited size. For heating unit volumes of water in the heating tank, there is preferably provided an automatically controlled water heater 3 of the same general type as the well known instantaneous automatic water heaters.

The heating tank 2 is connected to the storage tank 1 by means of a conduit 4 and to the heater 3 by means of a flow circuit including the heater and a pump 5, this circuit being such that a unit volume of water from the heating tank may be circulated through the heater and such tank as many times as may be necessary to sufficiently heat it. In one of these two conduits leading from the heating tank, there is a pressure relief valve which prevents flow through such conduit until the pressure upon the water is materially increased by the operation of the pump, and in the other conduit there is a valve, the position of which is thermally controlled in response to the temperature of the water in the heating tank. Preferably, the pressure relief valve is placed in the conduit leading to the storage tank and the thermally operated valve is arranged in the flow circuit through the heater.

The pressure relief valve may be of various forms of construction, a suitable form being indicated to enlarged scale in Fig. 3, which shows a spring loaded relief valve. The valve is arranged in a casing 6 having an inlet 7 connected to pipe 4 and an outlet 8. Cooperating with a valve seat 9 formed adjacent to the inlet there is a valve 10 normally urged towards the seat by means of a spring 11, the compression of which is such as to maintain the valve in closed position until the pressure on the lower face of the valve exceeds a predetermined amount. While the outlet 8 of the pressure relief valve may be connected to the upper portion of the storage tank it is preferably connected by pipe 4ª to a service pipe 12 leading from the top of the storage tank, so that, when heated water is being discharged from the heating tank, it may flow directly through the service pipe to a point of consumption in case there is a demand for heated water.

For controlling flow from heating tank 2 through heater 3 any suitable thermally operated valve may be used. The valve shown herein is the well known Powers regulator. It is arranged in a conduit 13 leading from the top of the heating tank to pump 5. Briefly described, the regulator comprises a tube 14 connected by a pipe 15 to a chamber 16 provided with a diaphragm which is connected to valve 17. A body of thermally expandible fluid is in tube 14, pipe 15 and chamber 16. When this fluid expands due to its being heated, the diaphragm closes the valve against the resistance of a suitable spring which tends normally to hold the valve open.

The continuous flow circuit controlled by the thermally operated valve 17 includes, in addition to conduit 13, and pump 5 previously mentioned, a conduit 18 leading from the pump to a flow motor 19 (the operation of which will presently be explained), a conduit 20 leading from the flow motor to the inlet of the heating coil in heater 3, and a conduit 21 connecting the outlet of the heating coil to the bottom of the heating tank. The flow motor 19 is of the well known type now used in instantaneous water heaters for controlling the supply of fluid fuel through a pipe 24 to the heater in response to the flow of water through the heater. Ordinarily, such flow motors open the fuel supply valve in response to unbalanced pressure effected by the opening of a hot water faucet in the service lines leading from the heater. In the present case the unbalanced pressure effective for operating the flow motor is caused by the operation of pump 5.

In addition to its connection to conduit 13, the inlet of pump 5 is also connected by a pipe 22 to a pipe 23 leading from a source of water supply. The lower portion of storage tank 1 is also connected to the water supply as by a pipe 22ª.

In the operation of the system as thus far explained pump 5 circulates water from heating tank 2 through heater 3 until it is sufficiently heated, at which time thermally operated valve 17 closes conduit 13. Thereafter, the pump adds sufficient pressure to the heated water to open relief valve 6 and discharges the heated water through conduit 4 into storage tank or service conduit 12 leading from it. When heated water is being discharged from the heating tank, cool water, taken either from the lower portion of the storage tank or from pipe 23, is pumped through the heater back of the heated water. When the cool water has passed through the heater once and reaches the top of the heating tank, the fluid in tube 14 will be cooled and, as a consequence thereof, will contract and permit valve 17 to open so that flow from the heating tank through the heater will again be established.

The improved system contemplates the provision of automatic mechanism for repeating the foregoing cycle of operation an indefinite number of times, namely, until the storage tank becomes supplied with its maximum intended volume of sufficiently heated water. To such end, pump 5 is preferably operated by means of an electric motor having an operating circuit controlled by a switch which is thermally operated in response to the temperature of the water in the lower portion of the storage tank. As diagrammatically shown in the drawings, an electric motor 25 is connected to pump 5 and current is led thereto through conductors 26 and 27 which may be connected to supply lines 28 and 29 by a manually operable switch 30. By conductors 31 and 32 conductor 27 is led through an electric switch 33 adapted to be operated by thermostat 34 projecting into the bottom portion of storage tank 1. The general construction of this thermostat and switch is illustrated to enlarged scale in Fig. 4. The thermostat is of the well known type commonly used in instantaneous automatic water heaters as well as in automatic storage water heating systems which thermostats include a rod 35, the outer end of which moves inwardly as the temperature to which the thermostat is subjected rises, and moves outwardly as such temperature falls. Switch 33 may be a standard snap switch having a control member 36 normally urged outwardly to open the switch. Arranged between the outer ends of control member 36 and the movable thermostat rod 35 there are a pair of pivoted levers 37 and 38 so arranged that a small movement of rod 35 causes a relatively large movement of the free end of lever 38, which lever may be normally pressed away from switch operating member 36 by a spring 39. When the outer end of rod 35 is in an outer position in response to a low temperature in the storage tank, the outer end of lever 38 presses switch operating member 36 towards the switch to close the circuit through conductors 31 and 32. Similarly, when the outer end of rod 35 is in an inner position in response to a higher temperature in the storage tank, the outer end of lever 38 is pressed away from switch operating member 36 by spring 39 to permit the switch to open the circuit through conductors 31 and 32 and in consequence thereof to open the circuit through motor 25.

The control of the motor circuit is preferably somewhat modified to the end that all of a unit volume of water may be discharged from the heating into the storage tank before the operation of the pump is stopped. For this purpose there is preferably arranged in conduit 4 a flow operated switch adapted to maintain the motor circuit closed while water is flowing through conduit 4. Of the various forms of such switches that may be used, a suitable form is illustrated in Fig. 2. Mounted upon a support 40 there is a switch 41 of the well known snap type provided with an operating member 42 which in outer position opens the switch. The flow motor for closing the switch comprises the casing 43 having an inlet 44 and an outlet 45, and to which switch-support 40 is attached. Within the casing there is arranged a plunger 46 adapted to be moved in one direction by the pressure of water flowing through inlet 44 and in the other direction by a spring 47. The movement of plunger 46 in response to the flow of water to the storage tank moves a stem 48, the outer end of which is adapted to strike and move the switch operating member 42 to close the switch. As soon as flow to the storage tank stops, spring 47 moves plunger 46 to its indicated position and the snap switch automatically opens the circuit so that if the circuit has been previously opened by thermostat 34 and switch 33, the motor circuit will then be opened and further circulation of water through the heater stopped.

If desired, the pump operating motor 25 may also be used to create an induced draft in water heater 3. For this purpose, a blower 50 may be attached to the motor and connected by a pipe 51 to a vent pipe 52 leading from the heater. The arrangement is such that as long as the motor is in operation to circulate water through the heater a draft will be induced through the heater to properly remove the products of combustion which may then be carried to any desired point for ultimate disposal. By this arrangement, there is eliminated the necessity of placing the water heater in a position to take the advantage of a sufficient natural draft.

In describing the complete operation of the system, it will be assumed that both the storage and heating tanks are filled with cool water. As a result of the cool water in the storage tank, control switch 33 will be closed, and, as a result of cool water in the heating tank, thermally controlled valve 17 will be opened. The closing of the line switch 30 sets motor 25 in operation so that cool water is withdrawn by pump 5 from the top of heating tank 2 through conduit 13, forced through heater 3 and returned through conduit 21 to the bottom of the heating tank. This flow of water operates flow motor 19 so that fluid fuel may flow through fuel supply pipe 24 to the burner of heater 3. Each time the water from the heating tank is thus circulated through the heater its temperature is stepped up an amount which may be readily determined by the design of the heater. For practical purposes this may be about 40°. When the water has become sufficiently heated, that is to say, heated to the desired temperature which is usually about 150° F., thermally controlled valve 17 is automatically closed, and the continued operation of pump 5 forces the heated water from the heating tank past the loaded valve 6 and into the upper portion of the storage tank. While this unit volume of heated water is being discharged, cool water enters the inlet of pump 5 through conduit 22 and is pumped through heater 3. This cool water forms a second unit volume which, upon reaching the top of heating tank 2, causes thermally controlled valve 17 to open so that the water may again circulate through the heater. This cycle of operation comprising the alternate heating of unit volumes of water in the heating tank and discharging them into the storage tank is continued indefinitely until the heated water in the storage tank extends downwardly to the level of thermostat 34 at which time switch 33 is opened by the movement of the thermostat. In case water is being discharged from the heating tank at the time switch 33 is opened flow motor 43 is effective to keep the motor circuit closed until all the heated water is discharged.

To avoid the taking of sufficiently heated water from the storage tank by the pump and its consequent heating to a steam forming temperature by being circulated through the heater, thermostat 34 is arranged at such distance above the connection of pipe 22ª to the storage tank that the capacity of the storage tank between this connection and the thermostat is slightly greater than the capacity of the heating tank. The heating tank being of small capacity, as compared to the storage tank, the thermostat may be placed quite near the bottom of the storage tank so that substantially the entire capacity of the storage tank may be used for storing sufficiently heated water.

The essential difference between the embodiment of the invention just explained and that illustrated in Fig. 5 is that in the latter the circulation of water through the heater and the flow of water from the heating to the storage tank is effected by gravity consequent upon the variation in the specific gravity of water at different temperatures. Referring to Fig. 5, the top of storage tank 60 is connected to the top of a heating tank 61 by means of a conduit 62. In this conduit, there is arranged a thermally controlled valve 63 operated on the same principle as the Powers valve 17 of Fig. 1, except that valve 63 is maintained closed in response to low temperature of the water in the heating tank and is open when such water becomes sufficiently heated. The heating tank is connected by conduits 64 and 65 to a coil heater 66 in such manner that water from the heating tank circulates by gravity through the heater until it becomes sufficiently heated. A pipe 67 leading from a source of water supply may be connected to storage tank 60 and heating tank 61 by pipes 68 and 69, respectively.

The control of the system may be effected by controlling the supply of fluid fuel to heater 66. For this purpose a thermostat 70 may be arranged in the storage tank in a position determined in the same manner as explained with reference to thermostat 34 of Fig. 1. Thermostat 70 is constructed to operate a valve arranged in a casing 71 adapted to control the flow of gas or other fluid fuel through a pipe 72 leading to a burner 73 in heater 66. The construction of thermostat 70 and valve 71 controlled by it may be the same as that now used in automatic hot water storage systems in which no heating tank is employed.

In explaining the operation of the system illustrated in Fig. 5 it will be assumed as a starting point that both the storage and heating tanks are filled with cool water. Burner 73 being lighted, water from the heating tank will circulate through heater 66 until the water in the upper portion of the tank becomes sufficiently heated, at which time thermally controlled valve 63 is automatically opened. The sufficiently heated water then flows by gravity into the upper portion of storage tank. Simultaneously therewith, cool water flows either from the lower portion of storage tank 60 or directly from supply pipe 67 into the lower portion of the heating tank. When cool water reaches the upper portion of the heating tank, valve 63 is automatically closed and water then circulates by gravity from the heating tank through the heater. This operation is continued until the storage tank is supplied with its maximum intended volume of sufficiently heated water which is determined by the position of thermostat 70. When the sufficiently heated water extends downwardly into the storage tank to or below the level of thermostat 70, the supply of fuel to burner 73 is shut off with a consequent stopping of the operation until the water in the storage tank cools or is withdrawn.

In the embodiment of the invention illustrated in Fig. 5, the storage and heating tanks are indicated as being in vertical positions. This, however, is not essential to the practice of the invention.

It is characteristic of this invention as shown in both the illustrative embodiments thereof that unit volumes of water are heated to a sufficient temperature in a heating tank and are subsequently discharged into a storage tank with the result that the storage tank receives only sufficiently heated water. In the preferred embodiment of the invention shown in Fig. 1, it requires but a small period of time, namely, about three minutes, to sufficiently heat a unit volume of water in the heating tank and discharge it into the storage tank. Therefore, in case of a large demand for heated water, there will not be a long period during which no sufficiently heated water is available but, on the contrary, assuming that the demand exceeds the supply, there will be a limited supply available every few minutes.

I claim:

1. An automatic storage water heating system, comprising a storage tank, a unit heating tank connected to the storage tank, and means for alternately heating unit volumes of water in the heating tank and discharging them therefrom into the storage tank until the latter contains its maximum supply of heated water.

2. An automatic storage water heating system, comprising a storage tank, a unit heating tank of smaller capacity than and connected to the storage tank, and means for alternately heating to a predetermined minimum temperature unit volumes of water in the heating tank and discharging them into the top of the storage tank until the latter tank contains its maximum supply of water heated to a predetermined minimum temperature.

3. A storage water heating system, comprising a storage tank, a unit heating tank connected to the storage tank, a heater connected to the heating tank, and means for effecting the circulation of water through said heating tank and heater until heated and therefrom discharging the heated water into the storage tank.

4. A storage water heating system, comprising a storage tank, a unit heating tank having its upper portion connected to the upper portion of the storage tank, a heater having its inlet connected to the upper portion and its outlet to the lower portion of the heating tank, and means for circulating water through said heating tank and heater until heated and to therefrom discharge the heated water into the storage tank.

5. An automatic storage water heating system, comprising a storage tank for heated water, a heating tank for water being heated, a heater, connections extending from the heating to the storage tank and from the heating tank through the heater, and thermally controlled means for directing insufficiently heated water from the heating tank through the heater and sufficiently heated water from the heating into the storage tank.

6. An automatic storage water heating system, comprising a storage tank, a unit heating tank connected to the storage tank, a heater having its water inlet and outlet connected to the heating tank, a valve operated in response to the temperature of the water in the heating tank effective in one position to permit the circulation of insufficiently heated water through the heating tank and heater and effective in its other position to permit the flow of sufficiently heated water from the heating to the storage tank.

7. An automatic storage water heating system, comprising a storage tank, a unit heating tank, a conduit connecting the top portions of said tanks with each other for the discharge of sufficiently heated water from the heating into the storage tank, a heater having its inlet and outlet connected to the heating tank for the circulation of insufficiently heated water from the heating tank through the heater, and means operable in response to the temperature of water in the heating tank for controlling the flow of water from the heating tank to the storage tank or to the heater.

8. An automatic storage water heating system, comprising a storage tank, a unit heating tank connected to the storage tank, a heater, conduits connecting the inlet and outlet of the heater to said heating tank, a valve in one of said conduits thermally operated in response to the temperature of the water in the heating tank to prevent flow of sufficiently heated water through the heater, and a pump effected when said valve is open to circulate water through the heating tank and heater and effective when said valve is closed to discharge heated water from the heating into the storage tank.

9. An automatic storage water heating system, comprising a storage tank, a unit heating tank, a conduit provided with a loaded valve connecting the top portions of said tank with each other, a heater, conduits connecting the inlet and outlet of the heater to said heating tank, a valve in one of said heater connecting conduits thermally operated in response to the temperature of the water in the heating tank to prevent flow of sufficiently heated water from the heating tank through the heater; and pressure applying means effective when said thermally operated valve is open to circulate water through the heating tank and heater and effective when the thermally operated valve is closed to open said loaded valve and discharge heated water from the heating into the storage tank.

10. An automatic storage water heating system, comprising a storage tank, a unit heating tank connected to the storage tank for the flow of heated water from the former into the latter, means for heating unit volumes of water in the heating tank and discharging them therefrom into the storage tank, and means responsive to the temperature of the water in the lower portion of the storage tank for stopping the operation of said first-mentioned means.

11. An automatic storage water heating system, comprising a storage tank, a unit heating tank connected to the storage tank, a heater connected to the heating tank, a pump for circulating water through the heating tank and heater until sufficiently heated and for therefrom discharging the heated water into the upper portion of the storage tank, and means responsive to the temperature of the water in the lower portion of the storage tank for controlling the operation of the pump.

12. A storage water heating system, comprising a storage tank, a heating tank, a conduit connecting said tanks to each other, a heater, a conduit including in a continuous water flow circuit said heating tank and heater, a pump for moving water through said heating tank, a pressure relief valve in one of said conduits and a valve controlling flow through the other conduit operable in response to the temperatures of the water in the heating tank, said pump being effective when said temperature operated valve is positioned in response to insufficiently heated water to circulate water from the heating tank through the heater and effective when the valve is positioned in response to sufficiently heated water to cause such water to flow into the storage tank.

13. An automatic storage water heating system, comprising a storage tank, a heating tank, a conduit connecting said tanks to each other and including a pressure relief valve, a heater, a conduit including in a continuous water flow conduit said heating tank and heater, a valve in said flow circuit operable in response to the temperature of sufficiently heated water in the heating tank for preventing flow through said circuit, and a pump in said circuit for circulating water through the heater until sufficiently heated and to thereupon discharge such water past said pressure relief valve into the storage reservoir.

14. An automatic storage water heating system comprising a storage tank, a heating tank connected to the storage tank, a heater connected to the heating tank, a pump for moving water through the heating tank, a motor for driving said pump, means for directing insufficiently heated water from the heating tank through the heater and sufficiently heated water from the heating tank into the storage tank, and thermally operated means for controlling the operation of said motor in response to the temperature of the water in the storage tank.

15. An automatic storage water heating system, comprising a storage tank, a heating tank connected to the storage tank, a heater connected to the heating tank, a pump for moving water through the heating tank, an electric motor for driving said pump and provided with an operating circuit, means for directing insufficiently heated water from the heating tank through the heater and sufficiently heated water from the heating tank into the storage tank, and a thermally operated switch for making and breaking said motor circuit in response to the temperature of the water in the lower portion of the storage tank.

16. An automatic storage water heating system, comprising a storage tank, a unit heating tank connected to the storage tank, a heater connected to the heating tank, a pump and a thermally controlled valve for circulating unit volumes of water from the heating tank through the heater until sufficiently heated and for discharging unit volumes of sufficiently heated water from the heating into the storage tank, an electric motor for driving said pump and provided with an operating circuit, a thermally operated switch for making and breaking said motor circuit in response to the temperature of the water in the lower portion of the storage tank, and a flow operated switch for maintaining said circuit closed during the discharge of a unit volume of heated water into the storage tank.

17. An automatic storage water heating system, comprising a storage tank, a heating tank connected to the storage tank, a water heater connected to the heating tank and including a flow motor for automatically controlling the flow of fluid fuel to the heater, a pump for causing flow of water from the heating tank through the heater and in consequence thereof to control said flow motor, and means for directing insufficiently heated water from the heating tank through the heater and sufficiently heated water from the heating tank into the storage tank.

In testimony whereof, I sign my name.

CHARLES I. BAKER.

Witness:
EDWIN O. JOHNS.